United States Patent [19]

Gentsch

[11] 4,096,943

[45] Jun. 27, 1978

[54] SNAP-ON TOP PLATE ASSEMBLY

[75] Inventor: C. Stewart Gentsch, Longmeadow, Mass.

[73] Assignee: Rexnord Inc., Milwaukee, Wis.

[21] Appl. No.: 635,837

[22] Filed: Nov. 28, 1975

[51] Int. Cl.² .............................................. B65G 17/14
[52] U.S. Cl. ..................................... 198/793; 198/851
[58] Field of Search ............... 198/189, 181, 182, 195, 198/175, 176, 793, 797, 472, 473, 851; 24/255 R

[56] References Cited

U.S. PATENT DOCUMENTS

| 1,780,169 | 11/1930 | Chadbourne | 24/255 R |
|---|---|---|---|
| 2,045,912 | 6/1936 | Howison | 198/189 |
| 3,708,059 | 1/1973 | Ackermann | 198/189 |
| 3,765,458 | 10/1973 | Ziegler et al. | 198/189 X |
| 3,842,968 | 10/1974 | Owens | 198/189 |

Primary Examiner—Evon C. Blunk
Assistant Examiner—Douglas D. Watts
Attorney, Agent, or Firm—Sughrue, Rothwell, Mion, Zinn and Macpeak

[57] ABSTRACT

The specification discloses a snap-on top plate assembly for a roller chain. The assembly comprises an inside saddle in the shape of a channel, an outside saddle in the shape of a channel shaped to fit over the inside saddle, and a top plate. The inside saddle has holes through its legs shaped and positioned to accept the outside ends of the pins in a link of roller chain when the link is positioned within the inside saddle. Three embodiments are disclosed. In two of them, the legs of the inside saddle are generally flat; in the other, the legs of the inside saddle are bowed inwardly.

13 Claims, 10 Drawing Figures

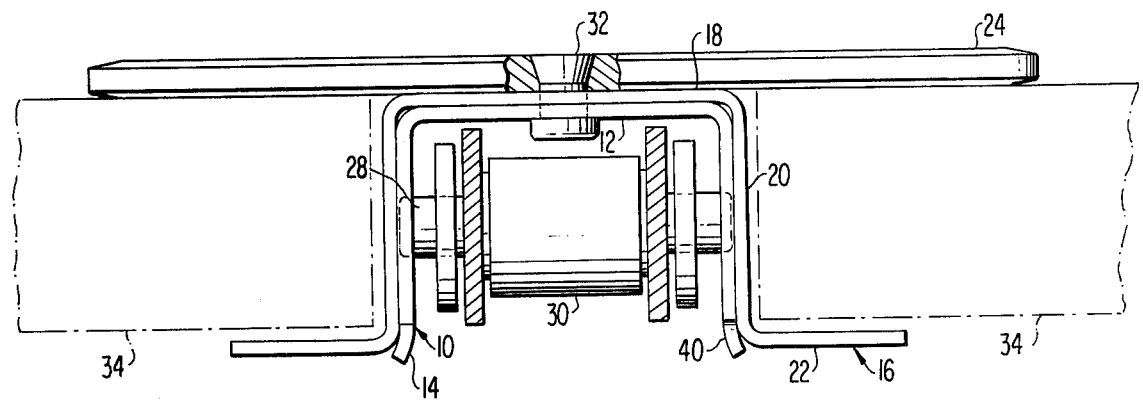
FIG. 1
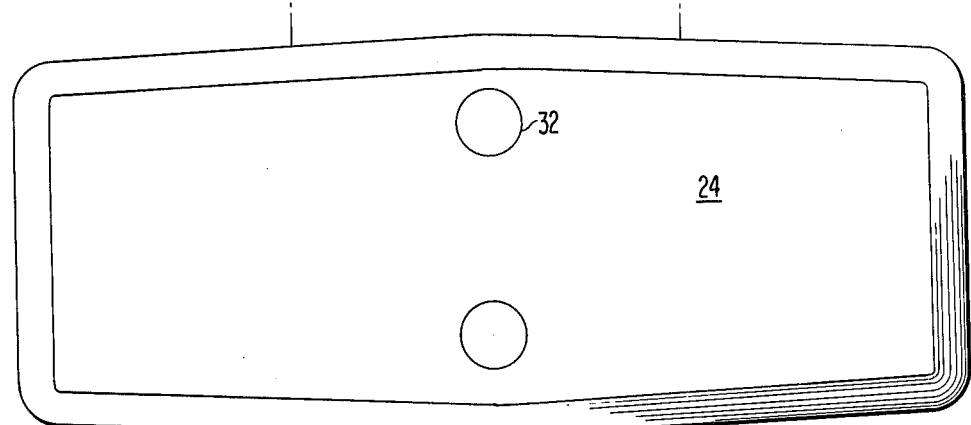
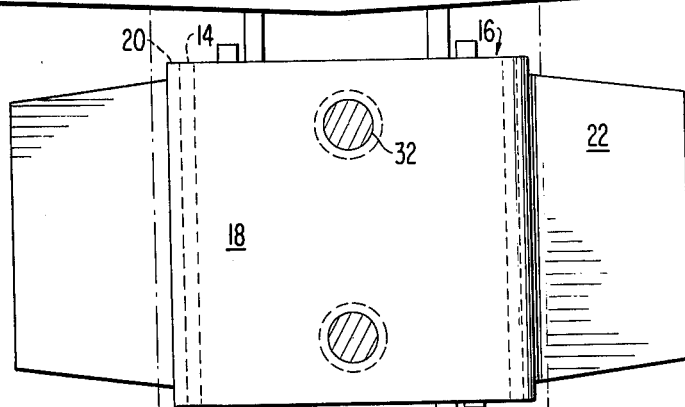
FIG. 2
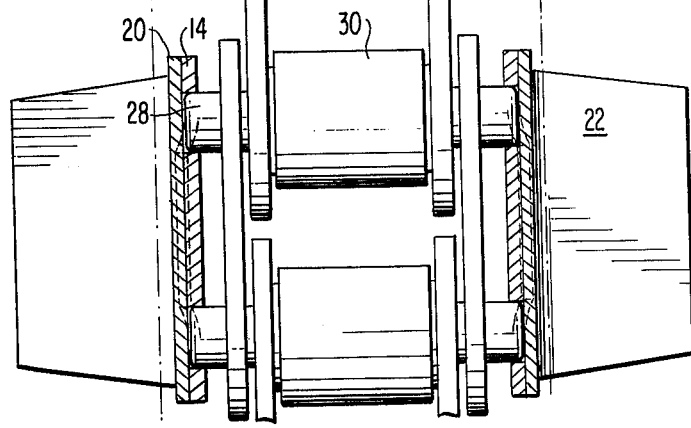

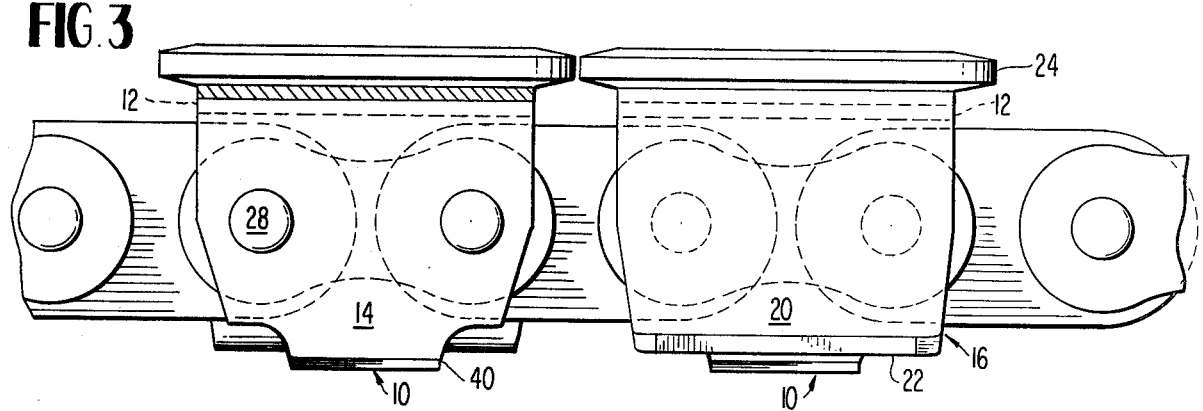
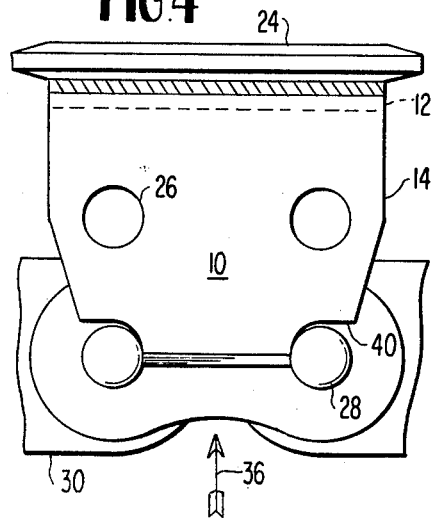
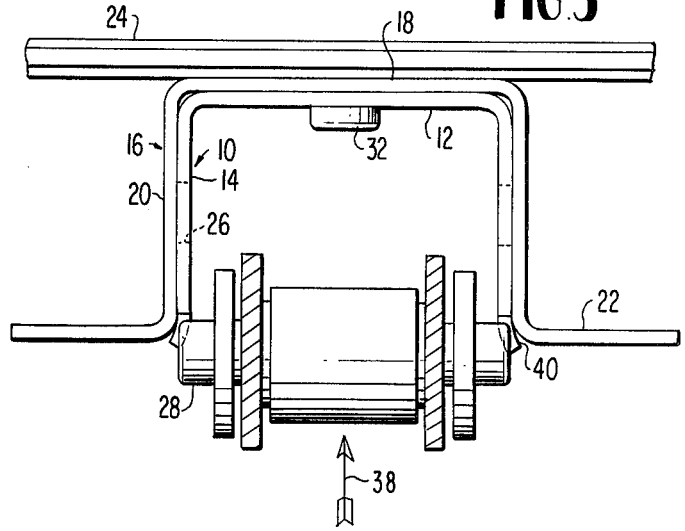
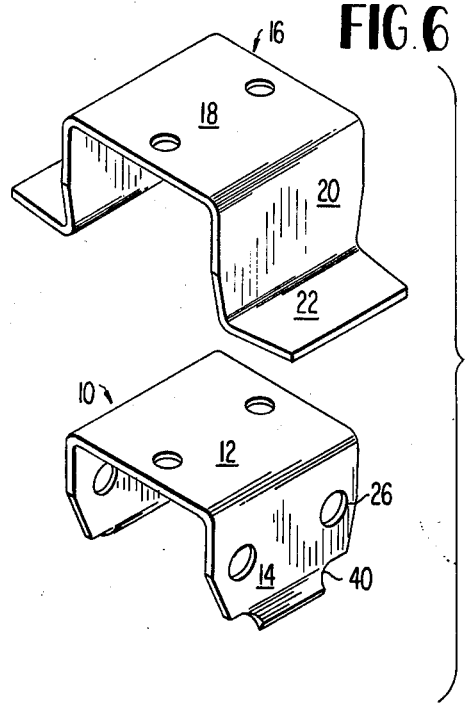
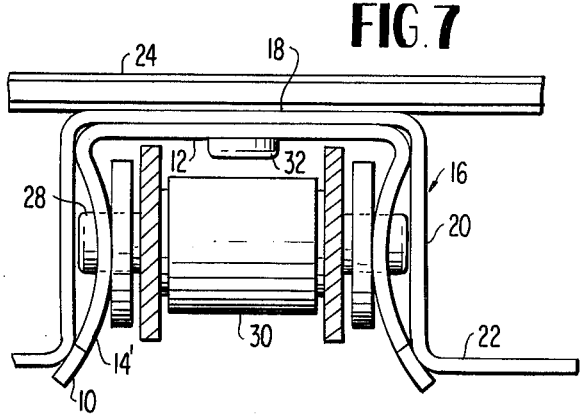

U.S. Patent June 27, 1978 Sheet 3 of 3 4,096,943

SNAP-ON TOP PLATE ASSEMBLY

FIELD OF THE INVENTION

This invention pertains to snap-on top plate assemblies for roller chains.

SUMMARY OF THE INVENTION

The invention is a snap-on top plate assembly comprising an inside saddle in the shape of a channel, an outside saddle in the shape of a channel shaped to fit over the inside saddle, and a top plate. The inside saddle has holes through its legs shaped and positioned to accept the outside ends of the pins in a link of roller chain when the link is positioned within the inside saddle.

BRIEF DESCRIPTION OF THE DRAWINGS

FIG. 1 is an end view of a first embodiment of the invention showing a link of roller chain positioned within the assembly.

FIG. 2 is a top view of three of the assemblies shown in FIG. 1 with parts broken away on the lower two assemblies to show progressively lower cross-sections thereof.

FIG. 3 is a side view of two of the assemblies shown in FIG. 1 with a part broken away in the left-hand assembly.

FIG. 4 is a side view of one of the assemblies shown in FIG. 1 during the operation of mounting the assembly on a link of a roller chain.

FIG. 5 is an end view of one of the assemblies shown in FIG. 1 during the operation of mounting the assembly on a link of a roller chain.

FIG. 6 is an exploded perspective view of two of the parts of the assembly shown in FIG. 1.

FIG. 7 is an end view of a second embodiment of the invention showing a link of roller chain positioned within the assembly.

DETAILED DESCRIPTION OF THE PREFERRED EMBODIMENTS

Figure 8:
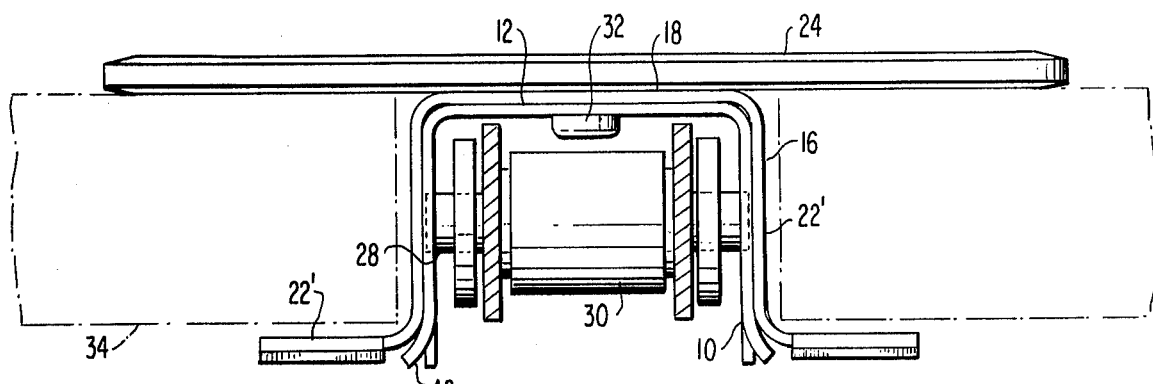
FIG. 8 is an end view of a third embodiment of the invention showing a link of roller chain positioned within the assembly.
Figure 9:
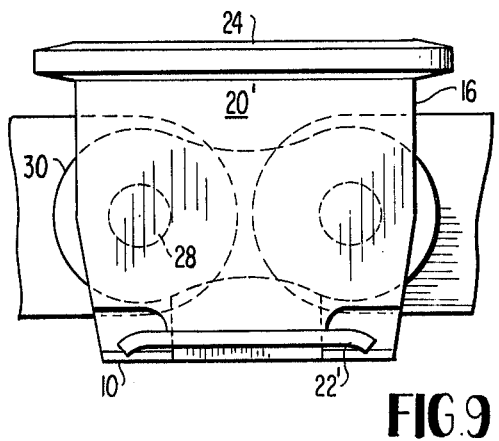
FIG. 9 is a side view of the embodiment shown in FIG. 8.
Figure 10:
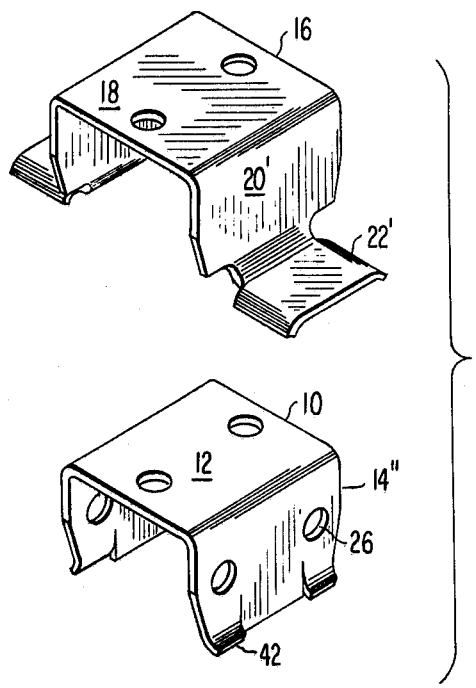
FIG. 10 is an exploded perspective view of two of the parts of the embodiment shown in FIG. 8.

The snap-on top plate assemblies shown in the drawings comprise an inside saddle 10 in the shape of a channel having a base 12 and two upstanding legs 14 (in FIGS. 1-6), 14' (in FIG. 7), or 14" (in FIGS. 8-10), an outside saddle 16 in the shape of a channel having a base 18, two upstanding legs 20 (in FIGS. 1-7) or 20' (in FIGS. 8-10), and flanges 22 (in FIGS. 1-7) or 22' (in FIGS. 8-10) extending outwardly from the ends of the legs 20, 20' remote from the base 18, and a top plate 24. The legs 14, 14', 14" have holes 26 therethrough shaped and positioned to accept the outside ends of pins 28 in a link of roller chain 30 positioned within the inside saddle 10. The outside saddle 16 is dimensioned to accept the inside saddle 10 therewithin with the base 18 and legs 20, 20' of the outside saddle 16 in close engagement with the base 12 and legs 14, 14', 14" of the inside saddle 10, and the outside saddle 16 and the inside saddle 10 together are dimensioned so that the outer ends of the pins 28 abut or nearly abut against the inside face of the legs 20, 20" of the outside saddle 16. The inside saddle 10 and the outside saddle 16 may be made from steel or any other relatively but not totally inflexible material, including plastic, appropriate for the intended environment.

Means comprising the rivets 32 are provided in the preferred embodiments for retaining the inside saddle 10 in place within the outside saddle 16 and for retaining the top plate 24 in place on the side of the base 18 of the outside saddle 16 opposite to the inside saddle 10. Obviously, the rivets 32 could be replaced by welding, bolting, screwing, or other mechanical means, and the means connecting the inside saddle 10 to the outside saddle 16 would not have to be located adjacent to the means for connecting the outside saddle 16 to the top plate 24. Preferably, however, the means joining the inside saddle 10 to the outside saddle 16 should join the respective bases thereof and not the legs, in order to permit relative movement of the legs during the mounting of the assembly on a link of roller chain. The flanges 22, 22' of the outside saddle 16 are shaped to cooperate with the top plate 24 in guiding the chain-mounted top plate assembly along the ways 34, shown only in FIGS. 1 and 8.

In order to facilitate the mounting of the top plate assembly on the link 30 of the roller chain in the manner shown in FIGS. 4 and 5 (wherein the arrows 36 and 38 indicate relative movement, not necessarily movement of the link 30 towards a stationary top plate assembly), the edges of the legs 14 or 14' remote from the base 12 are notched at 40 to accept the outside ends of the pins 28 as best seen in FIG. 4 to guide the pins 28 into the holes 26 in the legs 14. For the same reason, the ends of the legs 14, 14' remote from the base 12 are bent outwardly to act as a guide means to guide the links of the roller chain inbetween the legs 14, 14'. In the FIGS. 8-10 embodiment, the same affect is achieved by chamfering and bending outwards the tabs 42 on the legs 14".

FIGS. 1-6 and 8-10 show two embodiments of the subject invention in which the legs 14, 14" of the inside saddle 10 are generally flat, which is the easiest way to make them. FIG. 7 shows an embodiment of the subject invention in which the legs 14' of the inside saddle 10 have been bowed inwardly to improve pin retention at a slight cost in fabrication expense.

In use, the two-part construction of the top plate carrying means (i.e., the inside saddle plus the outside saddle) permits the inside saddle or the two saddles together to flex sufficiently for the pins 28 to snap into position in the holes 26, and the inside faces of the outside saddle abutting the ends of the pins 28 prevent the pins 28 from working sideways in the links 30, which has been a problem with the prior-art one-piece assemblies.

CAVEAT

While the present invention has been illustrated by a detailed description of three preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A snap-on top plate assembly for a roller chain, said assembly comprising:

(a) an inside steel saddle in the shape of a channel having a base and two upstanding, inwardly bowed legs, the legs having holes therethrough shaped and positioned to accept the outside ends of the pins in a link of roller chain when the link is positioned within said inside saddle, said inside saddle being made from a relatively but not totally inflexible material;

(b) an outside steel saddle in the shape of a channel having two upstanding legs, and flanges extending outwardly from the ends of the legs remote from the base, said outside saddle being dimensioned to accept said inside saddle therewithin with the base and the legs of said outside saddle in close engagement with the base and the legs of said inside saddle and the legs of said outside saddle extending up along the legs of said inside saddle at least past the holes therein said outside saddle being made from a relatively but not totally inflexible material;

(c) a top plate;

(d) first means for retaining said inside saddle in place within said outside saddle; and (e) second means for retaining said top plate in place on the base of said outside saddle on the side thereof opposite to said inside saddle.

2. A snap-on top plate assembly as recited in claim 1 wherein said inside and outside saddles are made from steel.

3. A snap-on top plate assembly as recited in claim 2 wherein the edges of the legs of said inside saddle remote from the base are notched to accept the outside ends of the pins in a link of roller chain and to act as a guide means to guide the pins into the holes in the legs of said inside saddle.

4. A snap-on top plate assembly as recited in claim 2 wherein the ends of the legs of said inside saddle remote from the base are bent outwardly to act as a guide means to guide the link of roller chain inbetween the legs of said inside saddle.

5. A snap-on top plate assembly as recited in claim 2 wherein said first and second means comprise one or more rivets passing through said inside saddle, said outside saddle, and said top plate.

6. A snap-on top plate assembly as recited in claim 2 wherein said first means join the base of said inside saddle to the base of said outside saddle but permits relative movement of the legs during the mounting of the assembly on a link of roller chain.

7. A snap-on top plate assembly for a roller chain, said assembly comprising:

(a) an inside steel saddle in the shape of a channel having a base and two upstanding legs, the legs having holes therethrough shaped and positioned to accept the outside ends of the pins in a link of roller chain when the link is positioned within said inside saddle, said inside saddle being made from a relatively but not totally inflexible material;

(b) an outside steel saddle in the shape of a channel having a base, two upstanding legs, and flanges extending outwardly from the ends of the legs remote from the base, said outside saddle being dimensioned to accept said inside saddle therewithin with the base and the legs of said outside saddle in close engagement with the base and the legs of said inside saddle and the legs of said outside saddle extending up along the legs of said inside saddle at least past the holes therein, said outside saddle being made from a relatively but not totally inflexible material;

(c) a top plate;

(d) first means for retaining said inside saddle in place within said outside saddle; and (e) second means for retaining said top plate in place on the base of said outside saddle on the side thereof opposite to said inside saddle.

8. A snap-on top plate assembly as recited in claim 1 wherein said inside and outside saddles are made from steel.

9. A snap-on top plate assembly as recited in claim 7 wherein the legs of said inside saddle are generally flat.

10. A snap-on top plate assembly as recited in claim 9 wherein the edges of the legs of said inside saddle remote from the base are notched to accept the outside ends of the pins in a link of roller chain and to act as a guide means to guide the pins into the holes in the legs of said inside saddle.

11. A snap-on top plate assembly as recited in claim 9 wherein the ends of the legs of said inside saddle remote from the base are bent outwardly to act as a guide means to guide the link of roller chain inbetween the legs of said inside saddle.

12. A snap-on top plate assembly as recited in claim 9 wherein said first and second means comprise one or more rivets passing through said inside saddle, said outside saddle, and said top plate.

13. A snap-on top plate assembly as recited in claim 9 wherein said first means join the base of said inside saddle to the base of said outside saddle but permits relative movement of the legs during the mounting of the assembly on a link of roller chain.

* * * * *